(12) United States Patent
Viitasalo et al.

(10) Patent No.: US 9,097,329 B2
(45) Date of Patent: Aug. 4, 2015

(54) TRANSMISSION MODULE AND TRANSMISSION ASSEMBLY METHOD

(75) Inventors: Ville Viitasalo, Suolahti (FI); Timo Ruokola, Jyvaskyla (FI)

(73) Assignee: Valtra Oy Ab, Soulahti (FI)

( * ) Notice: Subject to any disclaimer, the term of this patent is extended or adjusted under 35 U.S.C. 154(b) by 1486 days.

(21) Appl. No.: 12/600,918

(22) PCT Filed: May 16, 2008

(86) PCT No.: PCT/IB2008/001227
§ 371 (c)(1),
(2), (4) Date: Feb. 1, 2010

(87) PCT Pub. No.: WO2008/142525
PCT Pub. Date: Nov. 27, 2008

(65) Prior Publication Data
US 2010/0151984 A1    Jun. 17, 2010

(30) Foreign Application Priority Data
May 19, 2007 (GB) .................................. 0709636.5

(51) Int. Cl.
*F16H 47/04* (2006.01)
*F16H 57/033* (2012.01)
*B60K 17/28* (2006.01)
*F16H 37/08* (2006.01)

(52) U.S. Cl.
CPC .............. *F16H 47/04* (2013.01); *F16H 57/033* (2013.01); *B60K 17/28* (2013.01); *B60Y 2200/221* (2013.01); *F16H 2037/088* (2013.01); *F16H 2037/0886* (2013.01); *F16H 2057/0335* (2013.01); *F16H 2200/2007* (2013.01); *F16H 2200/2041* (2013.01)

(58) Field of Classification Search
USPC ............... 74/731.1, 732.1, 733.1, 718, 730.1; 475/72, 31, 83
See application file for complete search history.

(56) References Cited

U.S. PATENT DOCUMENTS

| | | | |
|---|---|---|---|
| 4,895,050 A * | 1/1990 | Meyerle | 62/48.2 |
| 5,299,985 A * | 4/1994 | Johnston | 475/53 |
| 6,592,485 B2 * | 7/2003 | Otten et al. | 475/83 |
| 7,848,858 B2 * | 12/2010 | Tabata et al. | 701/22 |
| 8,328,676 B2 * | 12/2012 | Legner | 475/82 |
| 2007/0105679 A1 * | 5/2007 | Tabata et al. | 475/5 |
| 2007/0202987 A1 * | 8/2007 | Kakinami et al. | 477/3 |
| 2008/0234914 A1 * | 9/2008 | Tabata et al. | 701/99 |
| 2010/0151984 A1 * | 6/2010 | Viitasalo et al. | 475/269 |

* cited by examiner

*Primary Examiner* — Erin D Bishop (57) ABSTRACT

There is provided transmission module (10) for a tractor which is selectively configurable between a CVT arrangement and a multi-ratio powershift transmission arrangement. The module comprises an epicyclic unit (13) in which a first gear element of the epicyclic is driven mechanically from the input shaft (11) and a second gear element of the epicyclic acts as an output of the transmission module. By simply connecting either a CVT unit (24) or a pair of clutches (80) between the input shaft and a third gear element the module (10) can be converted to the desired transmission arrangement. This delivers benefits in a factory for example whereby a large proportion of the assembly can be completed before tailoring the transmission to a customers requirements, thus reducing lead times on delivery.

18 Claims, 9 Drawing Sheets

| POWERSHIFT | | | | |
|---|---|---|---|---|
| STEP | C1 | C2 | C3 | C4 |
| 1 | X | – | – | X |
| 2 | X | – | X | – |
| 3 | X | X | – | – |
| 4 | – | X | X | – |
| 5 | – | X | – | X |

| POWERSHIFT | | | | | |
|---|---|---|---|---|---|
| STEP | C1 | C2 | C3 | C4 | C5 |
| 1 | X | – | – | X | – |
| 2 | X | – | X | – | – |
| 3 | X | – | – | – | X |
| 4 | X | X | – | – | – |
| 5 | – | X | X | – | – |
| 6 | – | X | – | – | X |
| 7 | – | X | – | X | – |

X = ENGAGED
– = DISENGAGED

| POWERSHIFT | | | | | | |
|---|---|---|---|---|---|---|
| STEP | C1 | C2 | C3 | C4 | C5 | C6 |
| 1 | – | – | X | – | – | X |
| 2 | – | – | – | – | X | X |
| 3 | X | – | – | X | – | – |
| 4 | X | – | X | – | – | – |
| 5 | X | – | – | – | X | – |
| 6 | X | X | – | – | – | – |
| 7 | – | X | X | – | – | – |
| 8 | – | X | – | – | X | – |
| 9 | – | X | – | X | – | – |

X = ENGAGED
– = DISENGAGED
C6 = ONE-WAY CLUTCH

TRANSMISSION MODULE AND TRANSMISSION ASSEMBLY METHOD

This invention relates to transmissions and in particular to epicyclic transmissions for use in agricultural tractors or similar vehicles.

In order to minimize factory lead times whilst also providing customers with a wide choice of available transmission specifications it is known to exploit a modular approach in the assembly of vehicle transmissions. For example, US-2002/0042319 discloses an infinitely variable transmission wherein transmission components are formed as pre-assembled modular units that can be combined to form overall transmission systems. In this, a self-contained infinitely variable transmission module is fabricated and serves as a common component to a range of available transmission systems. Constant transmission modules having different power categories and/or number of gear steps are attached to a flange of the common infinitely variable transmission module to provide different ranges of power input to output ratios. For example, the constant transmission modules can include planetary gears, and/or reversing units. Tractors fitted with infinitely variable transmissions, or continuously variable transmissions (CVTs), are not suited to all agricultural applications.

It is an object of the present invention to provide an improved modular transmission which can be assembled into alternative drive lines.

Thus according to a first aspect of the present invention there is provided a transmission module comprising an input shaft, an epicyclic gearing in which a first gear element of the epicyclic is driven mechanically from the input shaft and a second gear element of the epicyclic acts as an output of the transmission module, the epicyclic further comprising a third gear element, wherein the module is selectively configurable between:
  (a) a continuous variable transmission (CVT) arrangement wherein a continuous variable connection is made between the input shaft and the third gear element to drive the third gear element and hence the output shaft; and,
  (b) a multi-ratio powershift transmission arrangement wherein a first clutch and a second clutch are connected between the input shaft and the third gear element to either drive the third gear element from the input shaft or hold the third element fixed depending on which clutch is operated.

The module preferably further comprises a housing which includes a universal end flange having on an inner surface a first set of shaft supports for use in the CVT arrangement and a second set of shaft supports for use in the multi-ratio powershift transmission arrangement. The shaft supports of the universal end flange may adopt one of two configurations depending on the desired transmission arrangement. In some configurations for example, the end flange may have a redundant shaft support.

The first and second sets of shaft supports may share at least one common shaft support which may support the input shaft for example.

The epicyclic may have three compound planets which co-rotate in unison at all times, two planets acting as inputs to the epicyclic and engaging respective sun gears on the input shaft and the third planet acting as the output and engaging a respective sun gear on an output shaft of the epicyclic, two hydraulically operated clutches which are alternatively engageable to drive the input planets via their respective sun from the input shaft, and a carrier for the planets which is driven from the input shaft to provide the CVT arrangement.

The epicyclic may alternatively have a planet carrier driven from the input shaft, a sun gear connected with the output, and an annulus gear driven either via the continuous variable connection or connected with the first and second clutches in the powershift transmission arrangement.

The epicyclic may instead have two compound planets which co-rotate in unison at all times, the planets acting as inputs to the epicyclic and engaging respective sun gears on the input shaft, two hydraulically operated clutches which are alternatively engageable to drive the input planets via their respective sun from the input shaft, a carrier for the planets acting as the output, and an annulus gear driven either via the continuous variable connection or connected with the first and second clutches in the powershift transmission arrangement.

The module may further comprise a first gear which is drivably mounted on the input shaft, and a second gear meshed with the first gear, the second gear having a width that is less than the first gear. The provision of a thicker gear on the input shaft allows two overlapping gears to be driven therefrom. This increases the design freedom. For example, in a preferred embodiment of the CVT arrangement, a proportion of the width of the first gear remains redundant, whereas in a preferred embodiment of the multi-ratio powershift transmission arrangement, the first gear drives two overlapping gears. Advantageously, the first gear of such construction can be common to both arrangements thus further reducing the lead time on the assembly line.

In a first embodiment of the invention the transmission module further comprises the continuous variable connection, thereby providing a CVT arrangement. The continuous variable connection may be a pump/motor circuit, a variable ratio mechanical drive, or a variable ratio electrical generator/motor combination for example.

In a second embodiment of the invention the transmission module further comprises the first and second clutches, thereby providing a multi-ratio powershift transmission arrangement.

The transmission module may be part of an overall transmission wherein the output shaft of the epicyclic is preferably connected with a forward/reverse shuttle stage in which forward or reverse drive is selected by hydraulically operated forward and reverse drive clutches.

Further selectively engageable gear trains are also preferably driven from the power shuttle stage of the transmission.

The forward and reverse capability is provided by the shuttle stage and the total range of the overall transmission is extended by the further selectively engageable gear trains.

Typically the further selectively engageable gear trains provide two ratios high and low. A further even lower ratio can be provided if desired and a capability may also be provided to drive a power take-off shaft of the vehicle at a speed proportional to the ground speed of the vehicle.

When the vehicle is a tractor or other four wheel drive vehicle the further selectively engageable gear trains may drive a rear axle of the vehicle and a front axle of the vehicle via a front wheel drive clutch.

The power take-off shaft may also be driven directly from the input shaft via a power take-off clutch. The power take-off preferably includes gear trains to drive the power take-off shaft at the industry standard 1000 rpm or 540 rpm.

According to a second aspect of the present invention there is provided a method of assembling a transmission comprising providing a transmission module having an input shaft, an epicyclic gearing in which a first gear element of the epicyclic is driven mechanically from the input shaft and a second gear element of the epicyclic acts as an output of the transmission module, the epicyclic further comprising a third gear element, then, between the input shaft and a third gear element of the epicyclic, connecting either (a) a continuous variable connection to drive the third element and hence the output shaft to provide a continuous variable transmission (CVT) or, (b) first and second clutches to either drive the third element from the input shaft or hold the third element fixed depending on which clutch is operated thus providing a multi-ratio powershift transmission.

The modular transmission of the present invention enables, for example, a tractor manufacturer to provide a CVT and a multi-speed power shift transmission which use a high percentage of common modular parts.

Advantageously, the transmission module can be stockpiled with other modules before assembling the desired connection between the input shaft and a third gear element. This reduces the lead time on the assembly line wherein a significant proportion of a transmission can be assembled before a customer's specific requirements are incorporated.

The present invention will now be described, by way of example only, with reference to the accompanying drawings in which.

Figure 1:
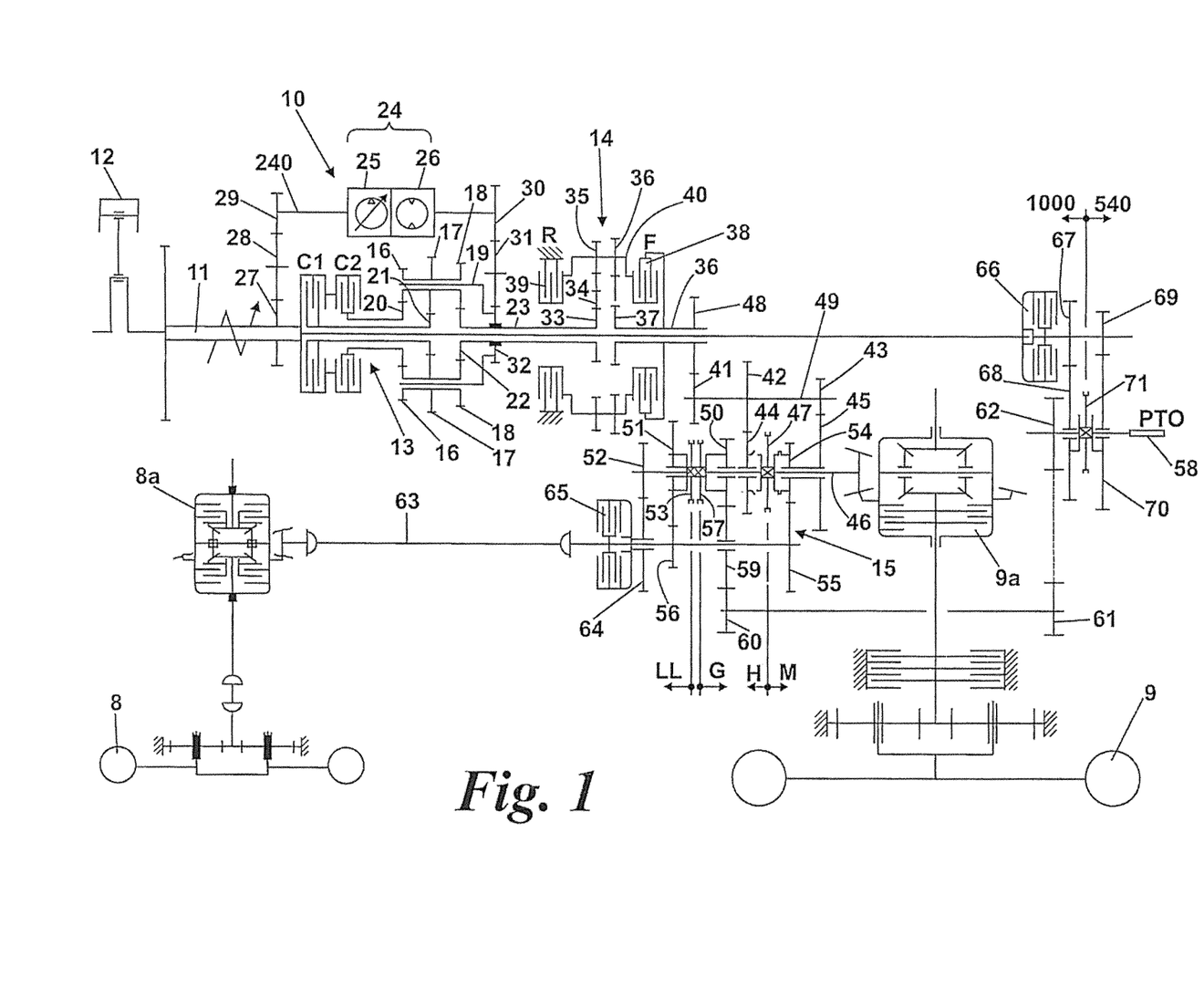
FIG. 1 shows diagrammatically the layout of a CVT form of a modular transmission in accordance with the present invention.

Referring to FIG. 1, a power-branched transmission module 10 of a tractor has an input shaft 11 driven from an engine 12. The input shaft drives an epicyclic gear 13, a forward/reverse shuttle stage 14 and an further selectively engageable gear train 15 all in series. Gear train 15 in turn drives the front and rear wheels 8 and 9 via differentials 8a and 9a respectively.

The epicyclic gear 13 has three compound planets gears 16, 17, and 18 which rotate in unison at all times and are supported from a common carrier 19. Planets 16 and 17 engage sun gears 20 and 21 respectively which can be coupled with input shaft 11 via clutches C2 and C1 respectively. The third planet gear 18 engages a sun gear 22 mounted on an output shaft 23 of the epicyclic gear which is connected with the shuttle stage 14.

A hydraulic pump/motor loop 24, which includes a variable displacement pump 25 connected with a motor 26, drives the planet carrier 19 from the input shaft 11 via gears 27, 28, 29, 30, 31, 32. The pump 25 is mounted on a shaft 240 which is driven by gear 29 mounted thereto.

The epicyclic gear 13 is designed to provide a continuous variation of ratio from a geared neutral condition in which the output shaft 23 is not rotating up to a ratio of say 2.2:1 or 2.6:1 as follows.

Initially clutch C1 is engaged which drives sun 21 from the input shaft 11 and the carrier is driven by the pump/motor loop 24 at speeds varying from the maximum negative speed of rotation of the carrier (i.e. with the carrier rotating at its maximum speed in the opposite direction to the direction of rotation of the engine), when the geared neutral condition exists, up to the maximum positive speed of the carrier (i.e. with the carrier rotating at its maximum speed in the same direction as the engine). This provides a ratio range of 0 to 1.

The clutch C2 is then engaged which drives sun 20 from the input shaft 11 and carrier 19 is driven by the pump/motor loop 24 from the maximum positive speed of rotation of the carrier to the maximum negative speed of rotation of the carrier. This provides the ratio range of 1 to 2.2.

The epicyclic forward/reverse shuttle 14 has a sun gear 33 on shaft 23 and a sun gear 37 on the output shaft 36. Planet gears 35 and 36 are mounted on a carrier 40 and a reverse idler 34 connects gears 33 and 35. Gears 36 and 27 also mesh without the use of an idler. Forward drive is engaged by engaging clutch 38 which locks the carrier 40 to the shaft 36. Reverse is engaged by engaging clutch 39 which locks the carrier 40 to the transmission housing.

Shaft 36 drives the further gear train 15 which is configured to give the required overall ratio range of the tractor. In the arrangement shown gears 41, 42, and 43 rotate with a shaft 49. Gear 41 meshes with gear 48 on shaft 36 to drive shaft 49 and gears 42 and 43 mesh with gears 44 and 45 and can be coupled to a differential pinion shaft 46 by a sliding coupler 47 (see arrow H) to provide a high gear train to shaft 46 via gears 42 and 44, which is used principally for road work and a low gear train (see arrow M) via gears 43 and 45 which provides maximum tractive force and is used principally for field work.

Gears 50 and 51 also surround shaft 46. Gear 51 can be coupled to shaft 46 (see arrow LL) using sliding coupler 53 to engage an even lower gear train via gears 43, 45, 54, 55, 56, and 51. If sliding coupler 57 is used to couple gear 50 to shaft 46 (see arrow G) the PTO shaft 58 is driven via gear train 50, 59, 60, 61 and 62 at a speed proportional to the ground speed of the tractor.

Gear 52 on shaft 46 drives the front wheel drive shaft 63 via gear 64 and front wheel drive clutch 65.

PTO shaft 58 can be driven from the input shaft 11 via a hydraulic clutch 66 and either gear train 67, 68 or 69, 70 using sliding coupler 71. Gear train 67, 68 gives a PTO shaft speed of 1000 r.p.m. at a specified engine speed whereas gear train 69, 70 gives a PTO shaft speed of 540 r.p.m. at the specified speed.

Figure 2:
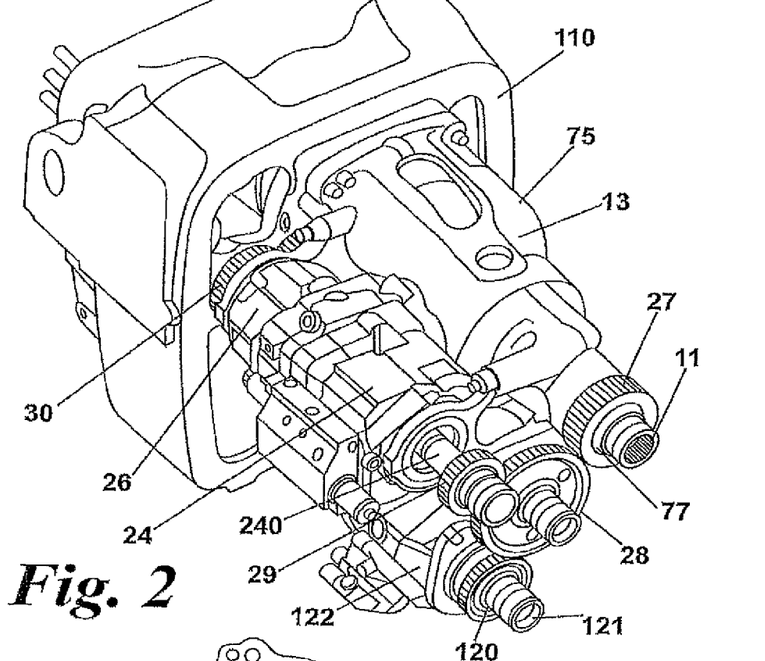
FIG. 2 is a schematic perspective view of a transmission module in a CVT arrangement in accordance with the present invention shown with the universal end flange removed.
Figure 3:
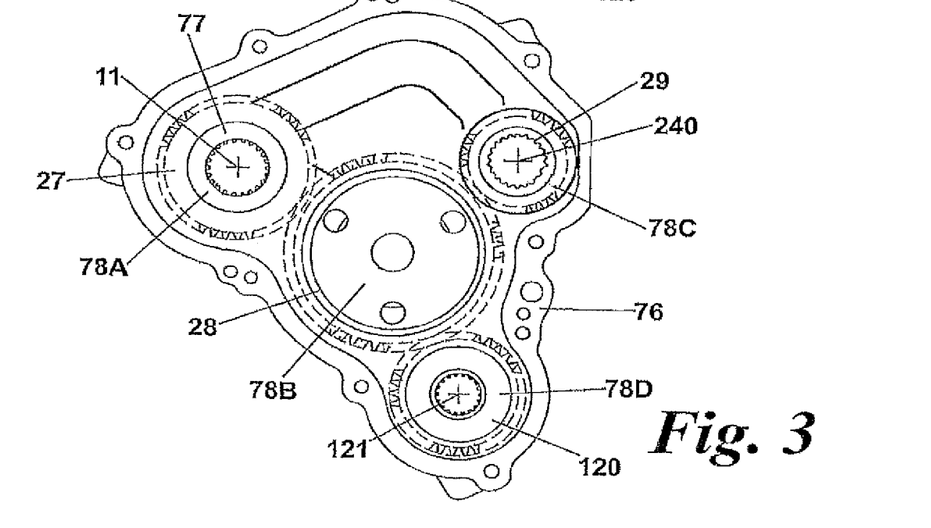
FIG. 3 is a sectional view of the universal end flange of the module of FIG. 2.

With reference to FIGS. 2 and 3 the transmission module 10 comprises a housing 75 which includes a universal end flange 76 at the forward end of the vehicle. The module 10 itself is housed within the chassis of a tractor 110. Input shaft 11 is supported by a bearing 77 located at one of a plurality of shaft support points 78A, 78B, 78C and 78D, provided by the universal end flange 76 which is bolted to the main housing 75.

The hydraulic pump/motor loop 24 is mounted on and driven by shaft 240. This component is added to the rest of the module 10 towards the end of the assembly line through an access hatch (not shown) provided in the chassis frame 110.

The output of the motor 26 drives gear 30 which drives the planet carrier 19.

FIG. 3 shows the four shaft support points 78A, 78B, 78C and 78D on the inside surface of the universal end flange 76 serving to support shafts for gears 27, 28 and 29. From here it can be seen that shaft 240 for the pump/motor loop 24 is driven by input shaft 11 via gears 27, 28 and 29 all supported by the universal end flange 76. Gear 27 has a width, or thickness, that is substantially greater, for example twice the thickness, than that of gear 28 for reasons that will become apparent below.

Gear 120 is meshed with gear 28 and is drivably mounted on shaft 121 which is supported by shaft support 78D. An auxiliary hydraulic pump 122 is driven by shaft 121 and is employed to operate auxiliary hydraulic functions of the tractor.

Figure 4:
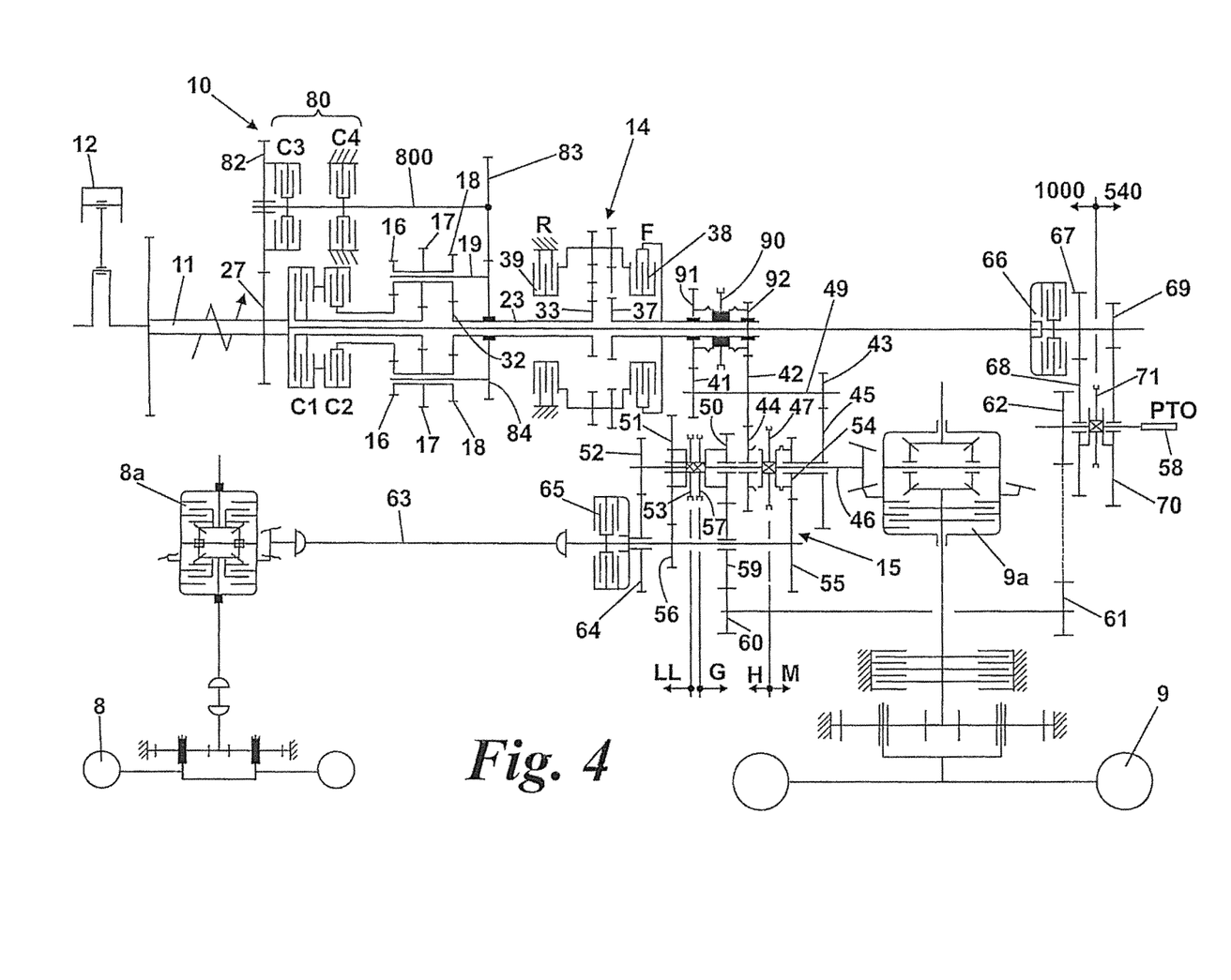
FIG. 4 shows diagrammatically the transmission of FIG. 1 modified into a five speed power shift transmission.
Figure 5:
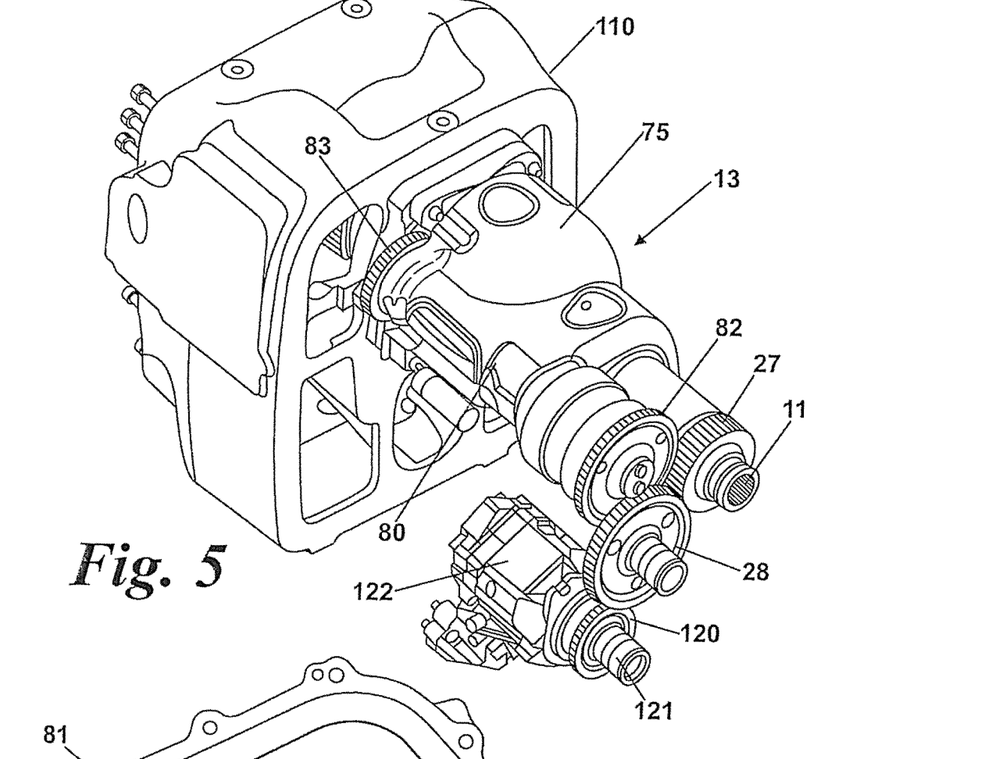
FIG. 5 is a schematic perspective view of a transmission module in a multi-ratio powershift transmission arrangement in accordance with the present invention shown with the universal end flange removed.
Figure 6:
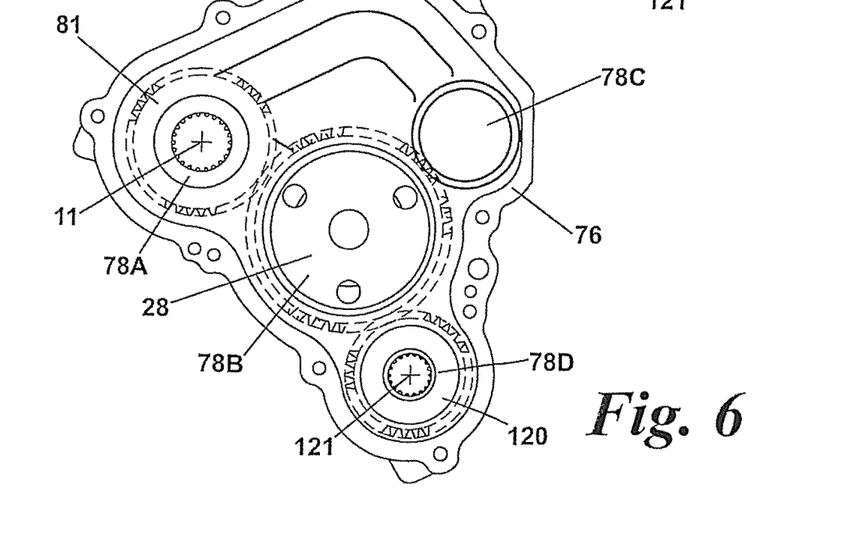
FIG. 6 is a sectional view of the universal end flange of the module of FIG. 5.
Figure 7:
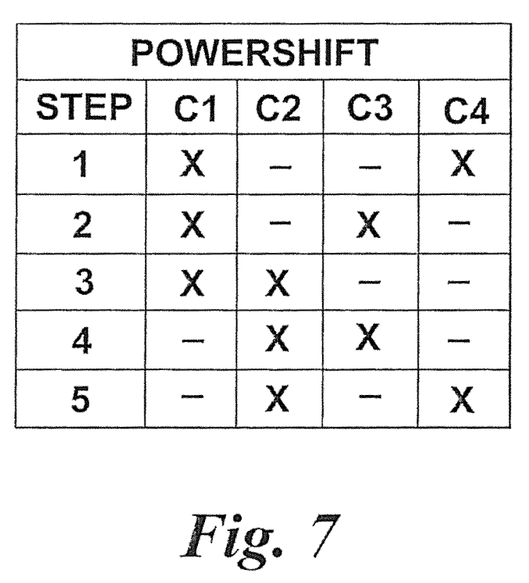
FIG. 7 shows a tabular summary of the engagement sequence of the clutches of the epicyclic powershift unit of FIG. 4.

The assembly of the CVT arrangement shown in FIGS. 1, 2 and 3 can easily be modified to instead provide a five speed multi-ratio powershift transmission of the form shown in FIGS. 4, 5 and 6.

As can be seen from FIG. 4, the main difference from the CVT module 10 of FIGS. 1, 2 and 3 is that the hydraulic pump loop 24 is replaced by a mechanical gear loop 80 which drives carrier 19 from input shaft 11 via gears 27, 82, 83, and 84 using clutch C3 and which holds the carrier 19 stationary using clutch C4.

The universal end flange 76 is selectively configurable to both the CVT and powershift transmission arrangements. In the latter arrangement the mechanical gear loop 80 is mounted on shaft 800 which is driven by gear 82. As can be seen from FIG. 5, gear 82 meshes with gear 27 and overlaps with gear 28 which remains in place to drive the hydraulic pump 122 (common to both arrangements). Thus shaft support 78C is left redundant in this arrangement (FIG. 6).

The position of the input shaft 11 is common to both arrangements shown in FIGS. 2 and 5. Furthermore, gear 27 is a common component in both arrangements wherein a proportion of the thickness thereof is redundant in the CVT arrangement.

By providing an end flange 76 which can accommodate a number of different shaft support configurations, the same component can be employed regardless of the final drive line required, and thereby allows a common assembly process for more parts of the transmission.

Although a universal end flange 76 has been used in the embodiments described thus far, it should be appreciated that a flange tailored for the desired arrangement could instead be used without deviating from the scope of the invention. Furthermore, a universal end flange could instead comprise a plurality of shaft support points which are not common to both arrangements.

Turning back to the multi-ratio powershift transmission of FIGS. 4, 5 and 6, FIG. 7 shows in tabular form the engagement sequence of the clutches C1, C2, C3 and C4 which gives the five ratios of the powershift provided by the epicyclic 13 and gear loop 80. Thus to engage the first ratio clutches C1 and C4 are actuated and to engage the second ration clutches C1 and C3 are actuated. The third ratio is engaged by actuating clutches C1 and C2 and the fourth ratio is engaged by actuating clutches C2 and C3. The fifth ratio is engaged by actuating clutches C2 and C4.

Also additional sliding coupler 90 is provided so that shaft 49 can be driven either via gears 91 and 41 or via gears 92 and 42 thus doubling the number of ratios which the further gear train 15 can provide.

Figure 8:
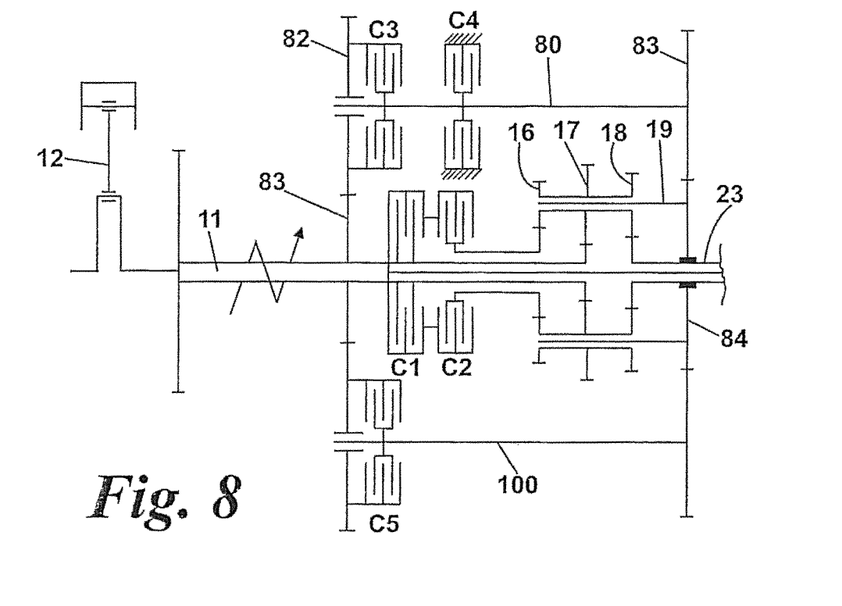
FIG. 8 shows diagrammatically the transmission of FIG. 1 modified into a seven speed epicyclic powershift transmission.
Figure 9:
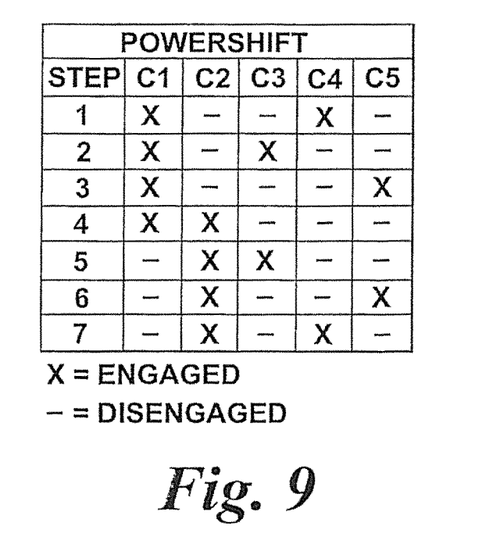
FIG. 9 shows a tabular summary of the engagement sequence of the clutches of the epicyclic powershift unit of FIG. 8.

FIG. 8 shows a further form of powershift transmission in which the five speed epicyclic unit of FIG. 4 is replaced by a seven speed epicyclic unit by the addition of a further mechanical loop 100 extending between the input shaft 11 and the planet carrier 19 which includes an additional clutch C5. FIG. 9 shows in tabular form the engagement sequence of clutches C1, C2, C3, C4 and C5 which provides the seven ratios of the epicyclic powershift unit.

Figure 10:
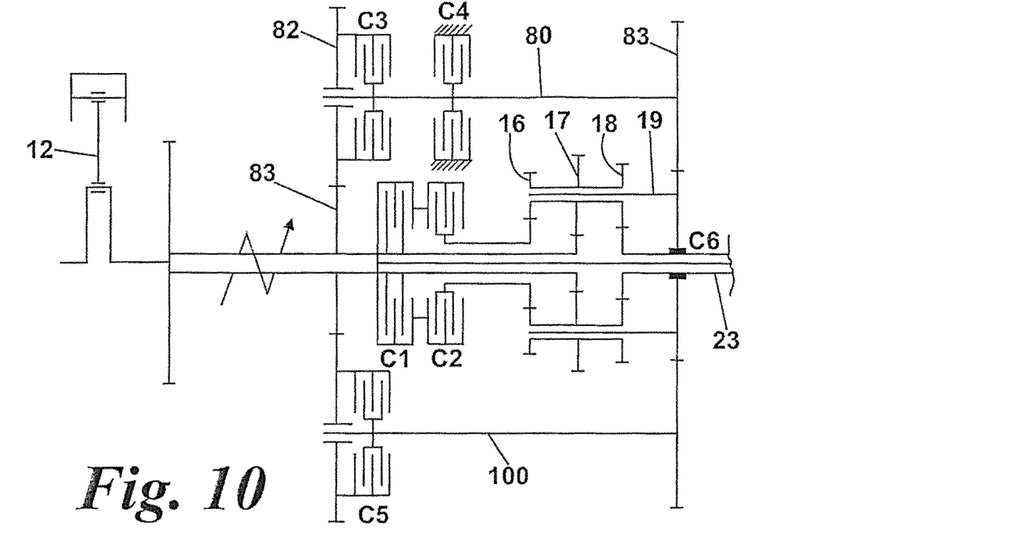
FIG. 10 shows diagrammatically the transmission of FIG. 1 modified into a nine speed epicyclic powershift transmission.
Figure 11:
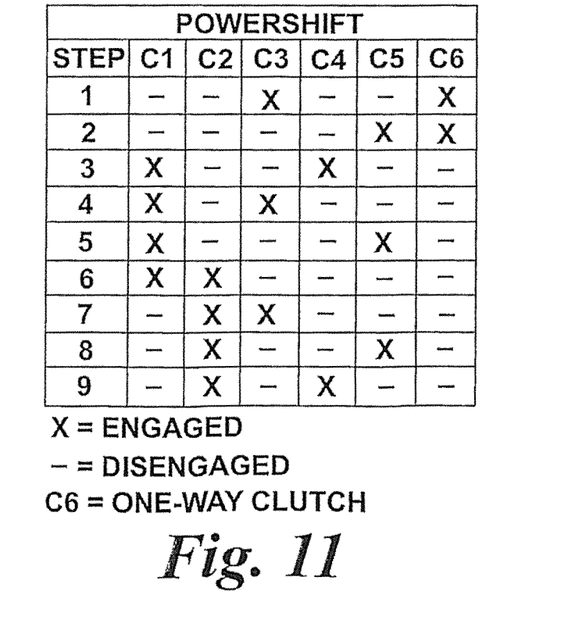
FIG. 11 shows a tabular summary of the engagement sequence of the clutches of the epicyclic powershift unit of FIG. 10.

A still further form of powershift transmission is shown in FIG. 10 where a one-way clutch C6 is added between the planet carrier 19 and the output shaft 23. In this arrangement when clutch C3 is engaged the output shaft 23 can be driven via gear load 80 by clutch C6 and similarly when clutch C5 is engaged the output shaft can be driven via gear loop 100 by clutch C6 to provide a nine speed epicyclic unit. FIG. 11 shows in tabular form the engagement sequence of all the clutches C1 to C6 to provide the nine ratios.

Figure 12:
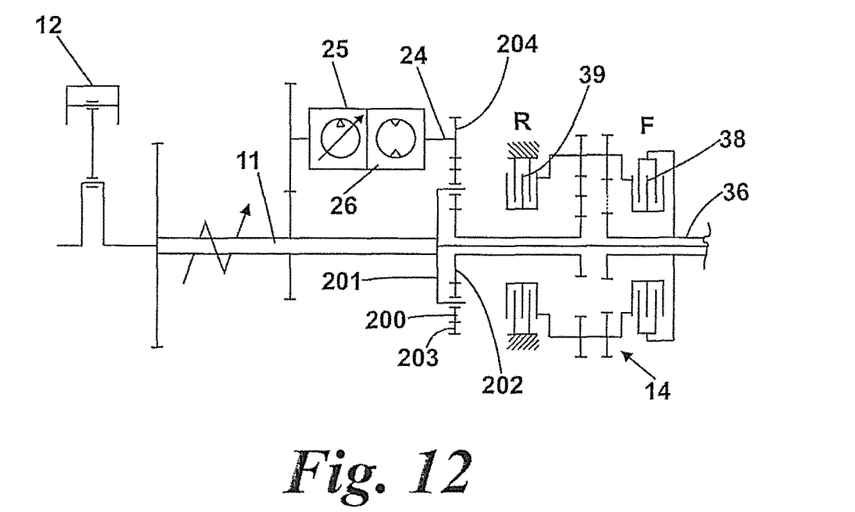
FIG. 12 shows a different form of epicyclic gear operating as a CVT.

The inventive concept of a modular transmission which can be assembled into alternative drive lines is applicable to other types of epicyclic gears. For example, the epicyclic CVT unit 10 of FIG. 1 which uses the compound planet gears 16, 17 and 18 can be replaced with a CVT in the form of a sun, planet and annulus gear as shown in FIG. 12 in which planet gears 200 are carried on a carrier 201 which is driven from input shaft 11. Planets 200 mesh with a sun gear 202 which drives output shaft 23 and also mesh with an annulus gear 203 which is driven from motor 26 via gear 204.

Figure 13:
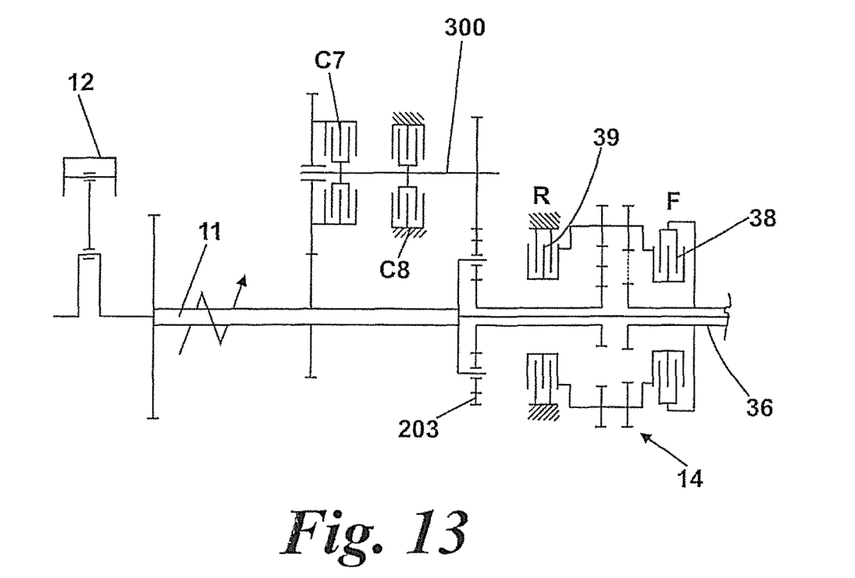
FIG. 13 shows the transmission of FIG. 12 modified into a powershift unit.

The CVT arrangement shown in FIG. 12 can be converted to the powershift arrangement shown in FIG. 13 by replacing the pump and motor loop 24 by the gear loop 300 which includes a clutch C7 which when engaged drive annulus gear 203 to provide a first ratio and a clutch C8 which when alternatively engaged holds the annulus gear 23 stationary to provide a second ratio. The remainder of the transmission is described in relation to FIG. 1.

Figure 14:
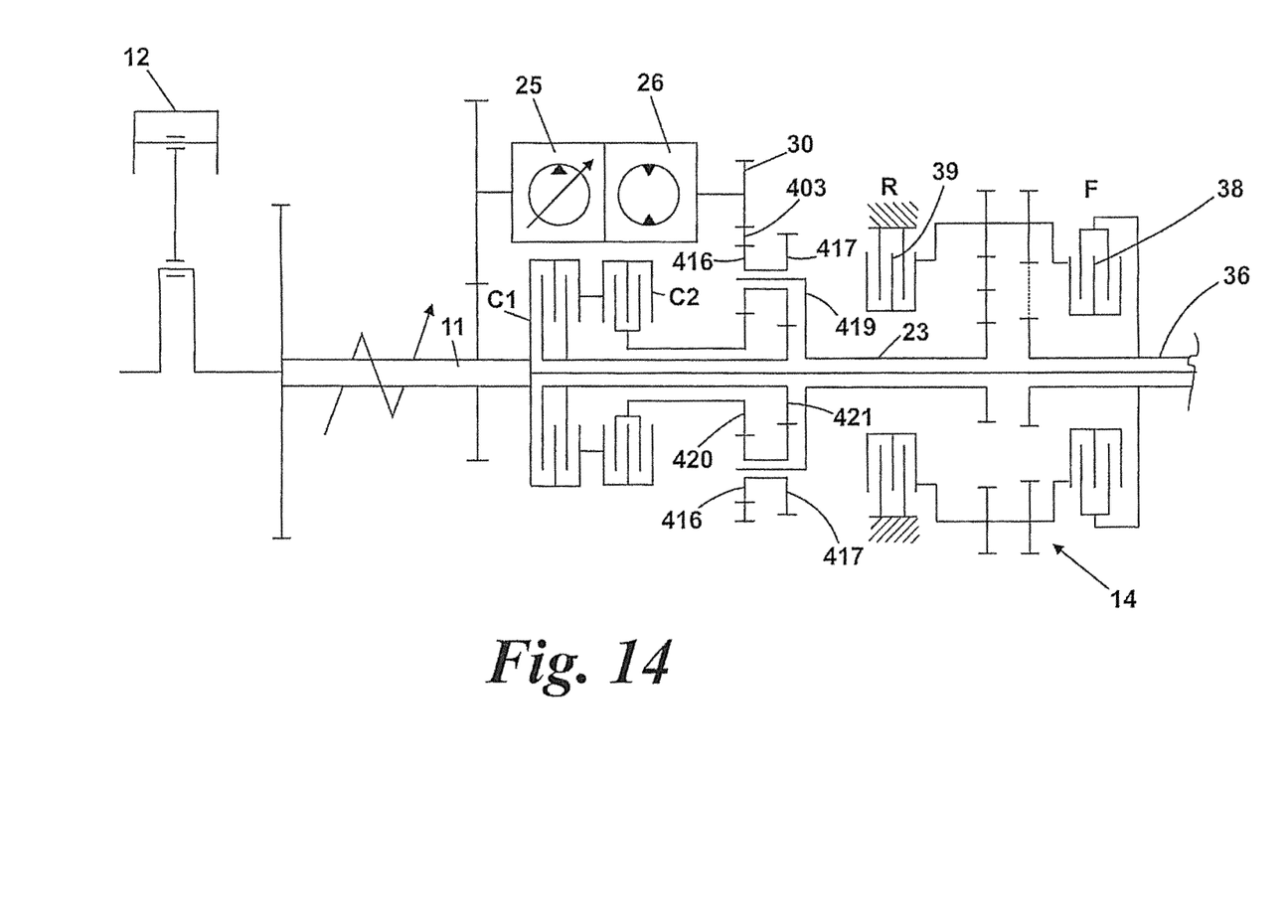
FIG. 14 shows yet another different form of epicyclic gear operating as a CVT.

With reference to FIG. 14, a further alternative epicyclic gearing arrangement is shown for a CVT. In a similar manner to the embodiment of FIG. 1 the transmission comprises two hydraulically operated clutches C1, C2, which are alternatively engageable to drive input planets 416, 417 via their respective sun 420, 421 from the input shaft 11. However, in this embodiment the output shaft 23 is drivably connected to the planet carrier 419. Gear 30, driven by the continuously variable connection 25, 26, meshes with an annulus (or ring) gear 403 which in turn meshes with the planet gears.

In a like manner to the CVT arrangement of FIG. 12, the CVT of FIG. 14 can be converted to a powershift arrangement by replacing the pump and motor loop 24 by a suitable gear loop (not shown).

Thus it will be appreciated that the modular transmission described above allows a tractor manufacturer to provide to his customers with either a CVT as shown, for example, in FIG. 1, or a five speed powershift transmission as shown in FIG. 4, or seven speed powershift as shown in FIG. 8, or a nine speed powershift as shown in FIG. 10 which have a high percentage of common components. Similarly the epicyclic CVT of FIG. 12 can be modified into the powershift transmission for FIG. 13.

Also, when the transmission is configured as a CVT it is possible to provide a high torque mode of operation wherein the continuously variable connection is locked out so that shafts 11 and 23 rotate in unison. Such a mode provides a highly efficient driveline which is particularly suitable for high torque applications such as ploughing. By locking together two elements of the epicyclic a direct 1:1 relationship is established between the input shaft 11 and the output shaft 23.

The provision of two clutches, which are otherwise alternatively engageable to drive respective input planets via their respective sun from the input shaft, delivers a simple route to locking two epicyclic elements together to provide the high torque mode. For example, the clutches C1 and C2 in the embodiments of FIGS. 1 and 14 can be simply engaged simultaneously whilst allowing the pump/motor loop 24 to rotate freely. When in the high torque mode the drive can be transmitted from output shaft 23 via gears 48, 41, 43, 45 to shaft 46 and hence to the wheels. Alternatively, road use could be catered for by transmitting drive from shaft 23 via gears 48, 41, 42, 44 to shaft 46.

The continuously variable connection can be allowed to rotate freely by a number of methods. For example, in the case of a variable hydraulic pump/motor circuits as shown in FIGS. 1 and 14, an open bypass valve can be provided. This serves to open the hydraulic connection between the pressure lines connecting the pump 25 and motor 26.

Alternatively, in the case of a closed loop control system controlling the speed of the hydraulic motor 26, the motor can be made to rotate with the same speed as the locked epicyclic. This results in no power being driven through the hydraulic variator circuit 24. If the pump/motor loop 24 is torque controlled, the control request can be set to zero which results in no load on the shaft 240.

On the assembly line, a tractor manufacturer can assemble a transmission module in accordance with the invention and stockpile a quantity of them as desired before configuring each of the modules one-by-one into either a CVT arrangement or a powershift transmission arrangement. Advantageously this reduces the time between a customer placing an order for a tractor with a desired transmission and delivery of that tractor.

In summary there is provided transmission module for a tractor which is selectively configurable between a CVT arrangement and a multi-ratio powershift transmission arrangement. The module comprises an epicyclic unit in which a first gear element of the epicyclic is driven mechanically from the input shaft and a second gear element of the epicyclic acts as an output of the transmission module. By simply connecting either a CVT unit or a pair of clutches between the input shaft and a third gear element the module can be converted to the desired arrangement. This delivers benefits in a factory for example whereby a large proportion of the assembly can be completed before tailoring the transmission to a customers requirements, thus reducing lead times on delivery.

The invention claimed is:

1. A transmission module comprising an input shaft, an epicyclic gearing in which a first gear element of the epicyclic gearing is driven mechanically from the input shaft and a second gear element of the epicyclic gearing acts as an output of the transmission module, the epicyclic gearing further comprising a third gear element, wherein the module:

(a) is configured to be used in a first configuration as part of a continuous variable transmission (CVT) arrangement wherein a continuous variable connection connects the input shaft with the third gear element to drive the third gear element, and wherein the third gear element drives an output shaft; and, (b) is configured to be used in a second configuration as part of a multi-ratio powershift transmission arrangement wherein a first clutch and a second clutch are connected between the input shaft and the third gear element to either drive the third gear element from the input shaft or hold the third element fixed depending on which clutch is operated.

2. The transmission module of claim 1, further comprising a housing which includes a universal end flange, the universal end flange having on an inner surface a plurality of shaft support points, wherein at least one of said plurality of shaft support points is for use in the CVT arrangement and wherein at least one of said plurality of shaft support points is for use in the multi-ratio powershift transmission arrangement.

3. The transmission module of claim 2, wherein the shaft support points share at least one common shaft support point used by both the CVT arrangement and the multi-ratio powershift transmission arrangement.

4. The transmission module of claim 3, wherein the input shaft is supported by said at least one common shaft support point.

5. The transmission module of claim 1, wherein the third gear element of the epicyclic gearing comprises first, second and third compound planets which co-rotate in unison at all times, and wherein the first gear element comprises two sun gears acting as inputs to the epicyclic gearing and engaging the first and second planets of the third gear element respectively and the third planet of the third gear element engaging the second gear element which is a sun gear on said output shaft, wherein the transmission module further comprises two hydraulically operated clutches which are alternatively engageable to drive the first and second planets via their respective sun gears from the input shaft, and wherein the third gear element also comprises a carrier for the three compound planets, the carrier being driven from the input shaft.

6. The transmission module according to claim 1, in which the first gear element of the epicyclic gearing comprises a planet carrier driven from the input shaft, the second gear element comprises a sun gear connected with the output, and the third gear element comprises an annulus gear driven either via the continuous variable connection or connected with the first and second clutches in the powershift transmission arrangement.

7. The transmission module according to claim 1, in which the epicyclic gearing comprises first and second compound planets which co-rotate in unison at all times, and wherein the first gear element comprises two sun gears acting as inputs to the epicyclic gearing and engaging the first and second planets, respectively, wherein the transmission module further comprises two hydraulically operated clutches which are alternatively engageable to drive the first and second planets via their respective sun gears from the input shaft, wherein the second gear element comprises a carrier for the planets, the carrier acting as the output, and the third gear element comprises an annulus gear driven either via the continuous variable connection or connected with the first and second clutches in the powershift transmission arrangement.

8. The transmission module of claim 1, further comprising a first gear which is drivably mounted on the input shaft, and a second gear meshed with the first gear, the second gear having a width that is less than the width of the first gear.

9. The transmission module of claim 8, in which the continuously variable connection between the input shaft and the third gear element is a variable hydraulic pump/motor circuit.

10. The transmission module of claim 8, wherein when the module is configured as part of the multi-ratio powershift transmission arrangement, said first and second clutches are driven by a third gear, said third gear being meshed with said first gear and overlapping with said second gear.

11. The transmission module of claim 1, further comprising a housing which includes a universal end flange having a redundant shaft support point.

12. The transmission comprising said module of claim 1 in which the output shaft of the epicyclic gearing is connected with a forward/reverse power shuttle such that forward or reverse drive is selected by hydraulically operated forward and reverse drive clutches.

13. The transmission of claim 12 further comprising selectively engageable gear trains driven from the power shuttle.

14. The transmission of claim 13 in which the selectively engageable gear trains each provide two gear ratios.

15. The transmission of claim 13 in which the selectively engageable gear trains each provide a further third gear ratio.

16. The transmission of claim 13, fitted to a vehicle in which the selectively engageable gear trains drive a rear axle of the vehicle and also drive a front axle of the vehicle via a front wheel drive clutch.

17. The transmission of claim 13 fitted to a vehicle and in which a capability is provided to drive a power take-off shaft of the vehicle at a speed proportional to a ground speed of the vehicle.

18. The transmission according to claim 17 in which the power take-off shaft may also be driven directly from the input shaft via a power take-off clutch and gear trains which drive the power take-off shaft at an industry standard selected from either 1000 rpm or 540 rpm.

\* \* \* \* \*